(12) United States Patent
Oommen et al.

(10) Patent No.: US 8,032,139 B2
(45) Date of Patent: Oct. 4, 2011

(54) METHOD AND APPARATUS FOR PROVIDING SYSTEM SELECTION USING DYNAMIC PARAMETERS

(75) Inventors: Paul Oommen, Sunnyvale, CA (US); Liangchi Alan Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 972 days.

(21) Appl. No.: 11/941,703

(22) Filed: Nov. 16, 2007

(65) Prior Publication Data

US 2010/0022243 A1     Jan. 28, 2010

Related U.S. Application Data

(60) Provisional application No. 60/866,351, filed on Nov. 17, 2006.

(51) Int. Cl.
*H04W 88/02*     (2009.01)
(52) U.S. Cl. .................. 455/435.2; 455/552.1
(58) Field of Classification Search ............ 455/435.2, 455/456, 552.1, 503, 436, 421, 450, 509, 455/456.1, 432.1, 456.3; 370/331, 401, 473, 370/475, 312, 432, 338, 328
See application file for complete search history.

(56) References Cited

U.S. PATENT DOCUMENTS

| | | | |
|---|---|---|---|
| 2003/0134636 A1* | 7/2003 | Sundar et al. | 455/432 |
| 2004/0002330 A1* | 1/2004 | Chitrapu | 455/426.2 |
| 2004/0203745 A1 | 10/2004 | Cooper | |
| 2006/0166699 A1* | 7/2006 | Aghvami et al. | 455/552.1 |
| 2006/0282554 A1* | 12/2006 | Jiang et al. | 710/14 |
| 2007/0121561 A1* | 5/2007 | Yashar et al. | 370/338 |
| 2008/0064393 A1* | 3/2008 | Oommen et al. | 455/432.1 |
| 2008/0198811 A1* | 8/2008 | Deshpande et al. | 370/332 |
| 2010/0069086 A1* | 3/2010 | Ahlin | 455/456.1 |

FOREIGN PATENT DOCUMENTS

| | | |
|---|---|---|
| WO | WO 2005/039112 A1 | 4/2005 |
| WO | WO 2005/117463 A2 | 12/2005 |
| WO | WO 2006/109159 A2 | 10/2006 |

OTHER PUBLICATIONS

International Search Report and Written Opinion, PCT/IB2007/003527, May 5, 2008, pp. 1-19.
Korean Office action for corresponding KR application No. 10-2009-7012464 dated Feb. 8, 2011, pp. 1-9.

* cited by examiner

*Primary Examiner* — Diane Mizrahi
(74) *Attorney, Agent, or Firm* — Ditthavong Mori & Steiner, P.C.

(57) ABSTRACT

An approach is provided for selecting, by a multi-mode device, one among multiple networks. A plurality of overlay parameters associated with a plurality of networks are acquired, wherein the networks are different from one another. Each of the networks is rated using the overlay parameters according to one or more selection criteria. One of the networks is selected based on the rating.

33 Claims, 11 Drawing Sheets

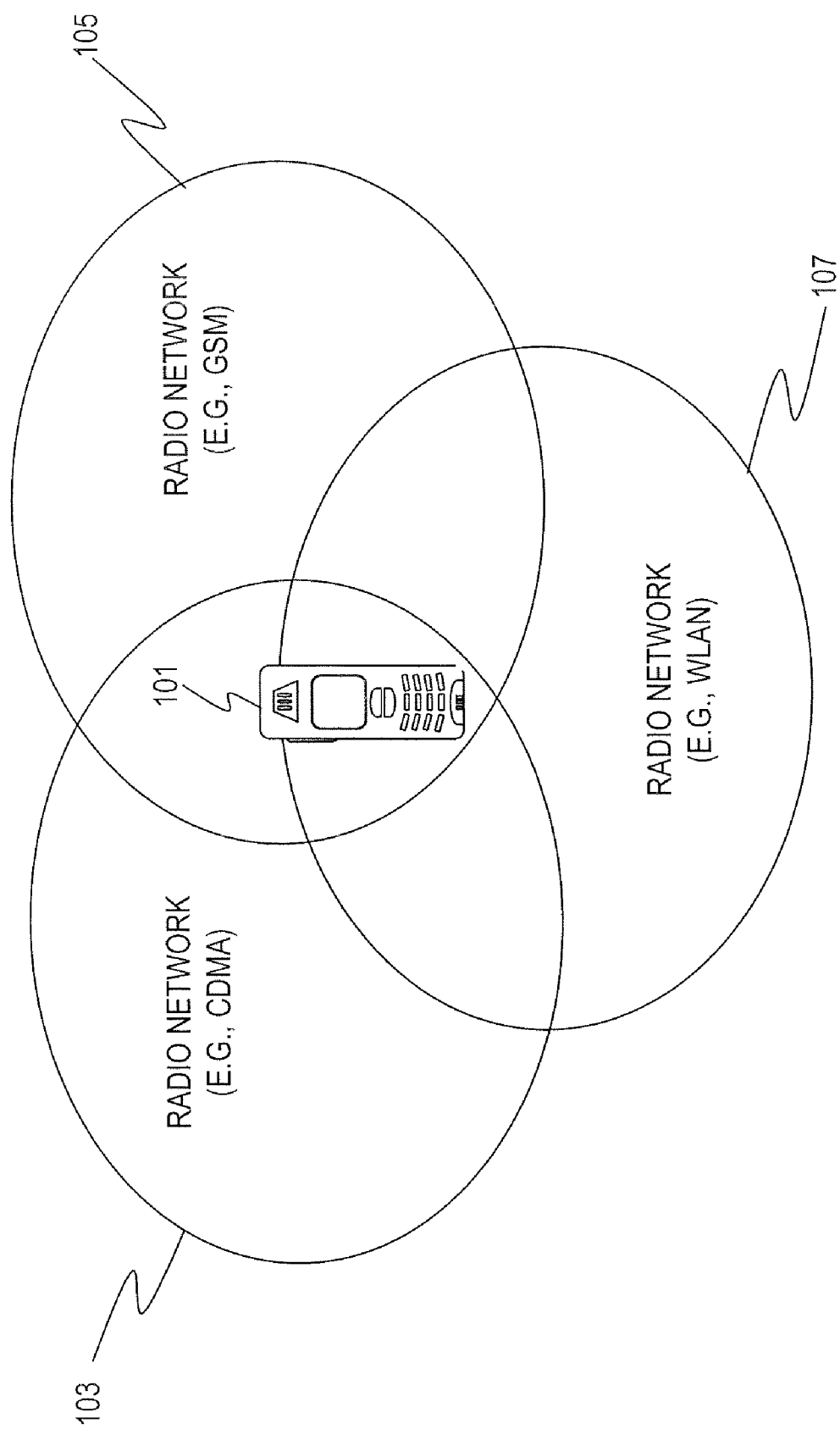

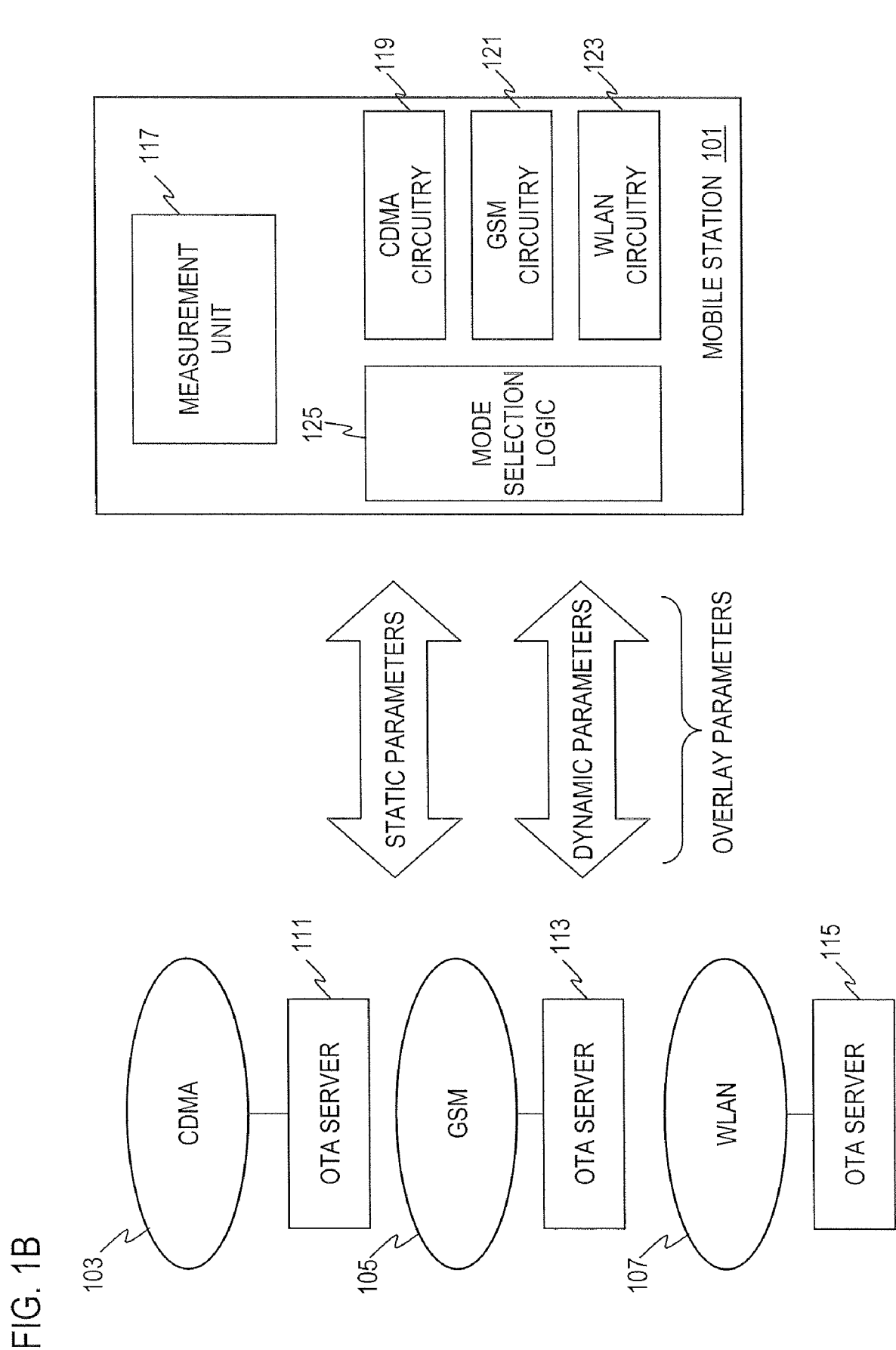

METHOD AND APPARATUS FOR PROVIDING SYSTEM SELECTION USING DYNAMIC PARAMETERS

RELATED APPLICATIONS

This application claims the benefit of the earlier filing date under 35 U.S.C. §119(e) of U.S. Provisional Application Ser. No. 60/866,351 filed Nov. 17, 2006, entitled "Method and Apparatus for Providing System Selection Using Dynamic Parameters," the entirety of which is incorporated herein by reference.

BACKGROUND

Radio communication systems, such as a Third Generation Partnership Project (3GPP) Network (GSM (Global System for Mobile Communications) or UMTS (Universal Mobile Telecommunications System)), 3GPP2 Network (IS-95 or CDMA2000), WLAN (IEEE (Institute of Electrical and Electronics Engineers) 802.11), WiFi (IEEE 802.11a/g wireless LAN (Wireless Fidelity), WiMax (Worldwide Interoperability for Microwave Access) IEEE 802.16), provide users with the convenience of mobility along with a rich set of services and features. This convenience has spawned significant adoption by an ever growing number of consumers as an accepted mode of communication for business and personal uses. Moreover, multiple radio networks co-exist, providing different and/or complementary services and coverage. Consequently, multi-mode terminals have been developed to take advantage of the variety and diversity of such services. To promote greater adoption, the telecommunication industry, from manufacturers to service providers, has agreed at great expense and effort to develop standards for communication protocols that underlie the various services and features. One key area of effort involves system selection in a multi-mode environment. Conventional approaches have focused on single mode selection standards—i.e., the use of static parameters for determining mode of operation. However, these approaches do not adequately account for changes in transmission conditions, particularly in a mobile environment, resulting in poor selection of the system.

SOME EXEMPLARY EMBODIMENTS

Therefore, there is a need for an approach to provide system selection in a multi-mode environment.

According to one embodiment of the invention, a method comprises acquiring a plurality of overlay parameters associated with a plurality of networks, wherein the networks are different from one another. The method also comprises rating each of the networks using the overlay parameters according to one or more selection criteria. Further, the method comprises selecting one of the networks based on the rating.

According to another embodiment of the invention, an apparatus comprises selection logic configured to acquire a plurality of overlay parameters associated with a plurality of networks, wherein the networks are different from one another. The selection logic is further configured to rate each of the networks using the overlay parameters according to one or more selection criteria, and to select one of the networks based on the rating.

According to another embodiment of the invention, a system comprises a server configured to store a plurality of overlay parameters associated with one of a plurality of networks, wherein the networks are different from one another. The system also comprises a base station configured to communicate with the server and to transmit the overlay parameters over the one network to a multi-mode mobile station that is configured to operate with each of the networks, wherein the multi-mode mobile station is within an overlapping coverage area of the networks. The multi-mode mobile station is further configured to rate each of the networks using the overlay parameters according to one or more selection criteria, and to select one of the networks based on the rating.

According to another embodiment of the invention, a method comprises storing an overlay parameter for a network, wherein the overlay parameter includes a dynamic parameter that is provided in real-time and a static parameter. The method also comprises transmitting the overlay parameter to a mobile station configured to acquire a plurality of overlay parameters from a plurality of networks, wherein the networks are different from one another. The mobile station is further configured to rate each of the networks using the overlay parameters to select one of the networks based on the rating.

According to yet another embodiment of the invention, an apparatus comprises a memory configured to store an overlay parameter for a network, wherein the overlay parameter includes a dynamic parameter that is provided in real-time and a static parameter. The apparatus also comprises a communication interface configured to transmit the overlay parameter via a base station to a mobile station. The mobile station is configured to acquire a plurality of overlay parameters from a plurality of networks, wherein the networks are different from one another. The mobile station is further configured to rate each of the networks using the overlay parameters to select one of the networks based on the rating.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 1A and 1B are diagrams of a multi-mode wireless terminal capable of operating in a multi-mode environment, in accordance with an embodiment of the invention;

DESCRIPTION OF PREFERRED EMBODIMENTS

Figure 2:
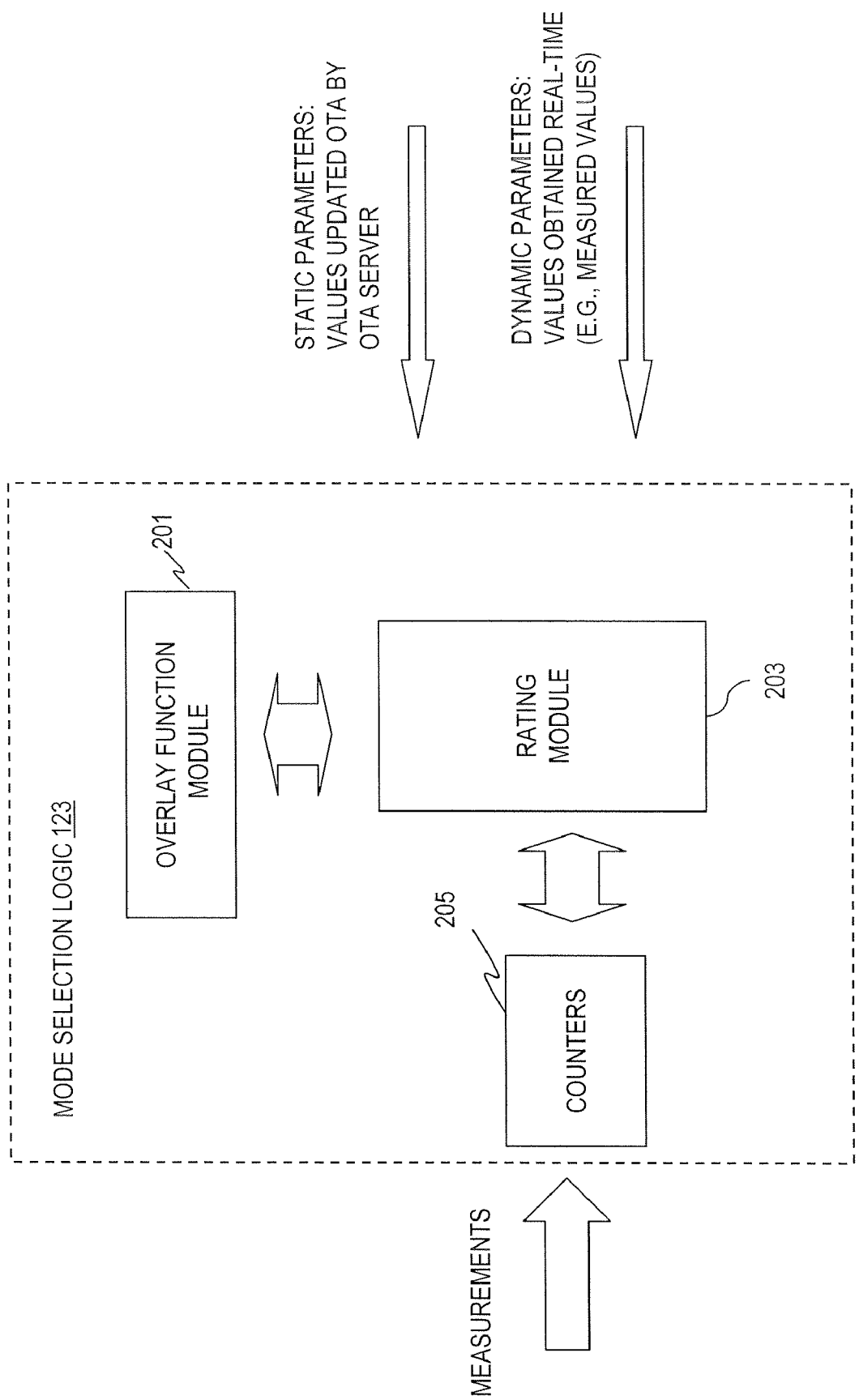
FIG. 2 is a diagram of a mode selection logic capable of selecting a radio network based on overlay parameters, in accordance with an embodiment of the invention.

An apparatus, method, and software for system selection are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although certain embodiments of the invention are discussed with respect to radio communication systems (e.g., Code Division Multiple Access (CDMA), Global System for Mobile Communications (GSM), wireless local area network (WLAN), or wireless metropolitan area network (WMAN)), it is recognized by one of ordinary skill in the art that the embodiments of the inventions have applicability to any type of communication system and other radio technologies.

FIGS. 1A and 1B are diagrams of a multi-mode wireless terminal capable of operating in a multi-mode environment, in accordance with an embodiment of the invention. According to an exemplary embodiment, a multi-mode wireless terminal 101 may be in a coverage area supported by multiple wireless (or radio) communication systems 103, 105, and 107, which employ different communication technologies. Under such circumstance, the multi-mode terminal 101 needs to determine which network 103, 105, and 107 is the "best" network to operate within. By way of example, radio network 103 can be a CDMA system, radio network 105 can be a GSM system, and radio network 107 can be a wireless local area network (WLAN) or a wireless metropolitan area network (WMAN).

The WLAN can utilize such architectures as IEEE (Institute of Electrical and Electronics Engineers) 802.11, or WiFi (IEEE 802.11a/g wireless LAN (Wireless Fidelity), while the WMAN can utilize a WiMax (Worldwide Interoperability for Microwave Access) IEEE 802.16 architecture. Although FIG. 1A shows three networks 103, 105, 107, it is contemplated that any number of networks can be implemented—e.g., two or more. The wireless terminal 101 can be any type of mobile stations, such as handsets, terminals, stations, units, devices, or any type of interface to the user (such as "wearable" circuitry, etc.). Although in certain embodiments, the terminal 101 is described as being mobile, it is contemplated that fixed wireless terminals can be utilized.

As shown, the multi-mode wireless terminal 101 can be configured to operate in a CDMA network 103 with a corresponding CDMA network coverage area that overlaps with the GSM coverage area of GSM network 105. Further, IEEE 802.11 WLAN technology of network 107 can be deployed to extend network coverage. Consequently, the wireless terminal 101 can simultaneously be within the coverage areas of all three different networks 103, 105 and 107. As such, the terminal 101 needs to select one of the systems; ideally, the terminal 101 should select the best system to support the particular application.

One traditional approach to multi-mode system selection rely solely on static parameters, in which predefined set of parameters are used to determine whether the mobile should function in a specific mode corresponding to particular network. However, as mentioned, it is recognized that multi-mode system selection that employ strictly static parameters can result in inferior selections, particularly because mobility of the terminal can alter environmental conditions. This static approach, hence, lacks flexibility in that the selection criteria may not reflect changes in system conditions.

As shown in FIG. 1B, according to an exemplary embodiment, a dynamic approach can be implemented in the multi-mode wireless terminal 101 (e.g., mobile station (MS)). The dynamic approach utilizes overlay parameters to assist with the system selection process. For example, the overlay parameters can include static parameters that are updated over the air (OTA) (i.e., over the air interface of a corresponding network 103, 105, or 107) and dynamic parameters that are input real-time. Such dynamic parameters can involve measurements taken on parameters, such as channel power, service availability, etc. Service availability can be either based on dynamically available information from the network (in receive mode) or measurements of quality of service parameters for specific systems in a particular location.

In this exemplary scenario, the dynamic parameters can originate from OTA servers (111, 113 and 115), which reside in networks 103, 105, and 107, respectively. It is noted that dynamic parameters can also be transmitted from the network via, for instance, a special message sent by the different systems (e.g., CDMA network 103, GSM network 105, WLAN network 107, or wireless metropolitan area network (WMAN) (not shown), etc.). Further, in addition to the network, the measured values can be provided by the MS 101 itself. Accordingly, the MS 101 includes a measurement unit 117.

In an exemplary embodiment, the wireless terminal 101 uses multiple receivers—one for each system (the MS can have receivers CDMA 103, WLAN 107, GSM 105). In this scenario, the MS 101 can collect information from each system by using circuitries 119 121 and 123 for the respective networks 103, 105, and 107. In one embodiment, the wireless station 101 can detect, for example, pilot signal strength in CDMA 103, beacon frequency signal strength in GSM 105 or WLAN beacon channel 107 received power. Based on a comparison of these measurements obtained for physical channels of different systems, the wireless terminal 101, via a mode selection logic 125, can select the "best" system.

In this example, the mobile station 101 collects information from each of the different communication systems 103, 105, and 107 in order to determine the best system. For example, the power measurements and comparison can take into account the fact that different systems follow different levels of measured power as the criteria for deciding a "good" channel. Apart from simple measurement of power, Link Quality Measurements (LQM) can be determined for each air-interface of the networks 103, 105, and 107. In one embodiment, the mode selection logic can be set to acquire simple measurements for faster switching or detailed LQM.

Exemplary parameters for determining LQM can include frame error rate, packet loss rate, or any useful measure for estimating the quality of a link. Additionally, various methods can be used to estimate the quality of a link—e.g., Clear Channel Assessment (CSA), received signal strength report indication (RSSRI), etc. In addition to or in lieu of, measurements can be performed by the networks 103, 105, and 107, as well as the measurement unit 117 of the mobile station 101.

It is noted that in the case in which the mobile station 101 is a handset, battery life is a paramount concern, especially given the fact that handsets can be deployed with a variety of functional capabilities, e.g., camera, music player, personal digital assistant (PDA), etc., which can consume substantial power. To save battery life, the mode selection logic 125 can minimize the need to acquire dynamic parameters, and rely mainly on static parameters for the network selection process. Accordingly, a dynamic parameter can be defined to be the time interval or period between scanning for the next priority system in the system priority list. This period or interval can be dynamically adjusted to save battery life. However, if battery life is not an important consideration (but performance is paramount), both static parameters and dynamic parameters (e.g., real-time measurements) can be used. According to certain embodiments, the use of real time parameters can be dependent on the need to use a specific service. Certain services may be available only in one system, and in such cases finding the system offering the best service need not be limited by battery life concerns. This depends, for instance, on requirements of the user or operator specified criteria.

FIG. 2 is a diagram of mode selection logic capable of selecting a radio network based on overlay parameters, in accordance with an embodiment of the invention. For the purposes of illustration, the mode selection logic 125 includes an overlay function module 201, which acquires overlay parameters from the OTA servers 111, 113, and 115. The module 201 can acquire these parameters when the selection process is initiated and subsequently obtain the parameters according to a predetermined interval. For the dynamic parameters, the acquisition is performed on a real-time basis. In an exemplary embodiment, overlay parameters can be implemented in the SIM (Subscriber Identification Module)/R-UIM (Removable User Identity Module)/USIM (Universal SIM) or in any type of memory in mobile station 101. The overlay function module 201 supplies the overlay parameters to a rating module 203, which determines the best or "highest priority" network using the overlay parameters.

As seen, hardware counters 205 can be used for measurements at different layers. The values from these counters can be used to estimate link quality, for instance, as well as frame error counts at physical layer, count of IP (Internet Protocol) packets received in error, lost packets or statistical measures for any layer or protocol. There are two aspects of this exemplary implementation. One aspect is programming the parameters using OTA methods, and the other aspect involves taking real-time measurements on these parameters. If security of OTA update is of concern, the OMA DM (Device Management) protocol can be used, as it offers levels of security in addition to Transport Layer Security and air-interface security. In one embodiment, the measurement (overlay logic) can be linked to a diagnostics and monitoring framework, such as OMA DM diagnostics and monitoring. As described, the overlay parameters (i.e., both static parameters and dynamic parameters) can be used for determining the high priority ("most preferred") system mode to the wireless terminal 101. To achieve this, the overlay parameters can include parameters whose values are set through OTA programming (static parameters) as well as parameters whose values are obtained in real-time through measurement (e.g., dynamic parameters). In an exemplary embodiment, the static and dynamic parameters can be updated to the mobile station 101 using OTA management protocols, such as OMA Device Management.

In an exemplary embodiment, a system priority list is employ, in which the list specifies a mobile station's prioritized set of networks. The list, for example, can be a static parameter that is set by an operator and programmed OTA. For each system, in the system priority list, dynamic parameters can be obtained in real-time.

Figure 3:
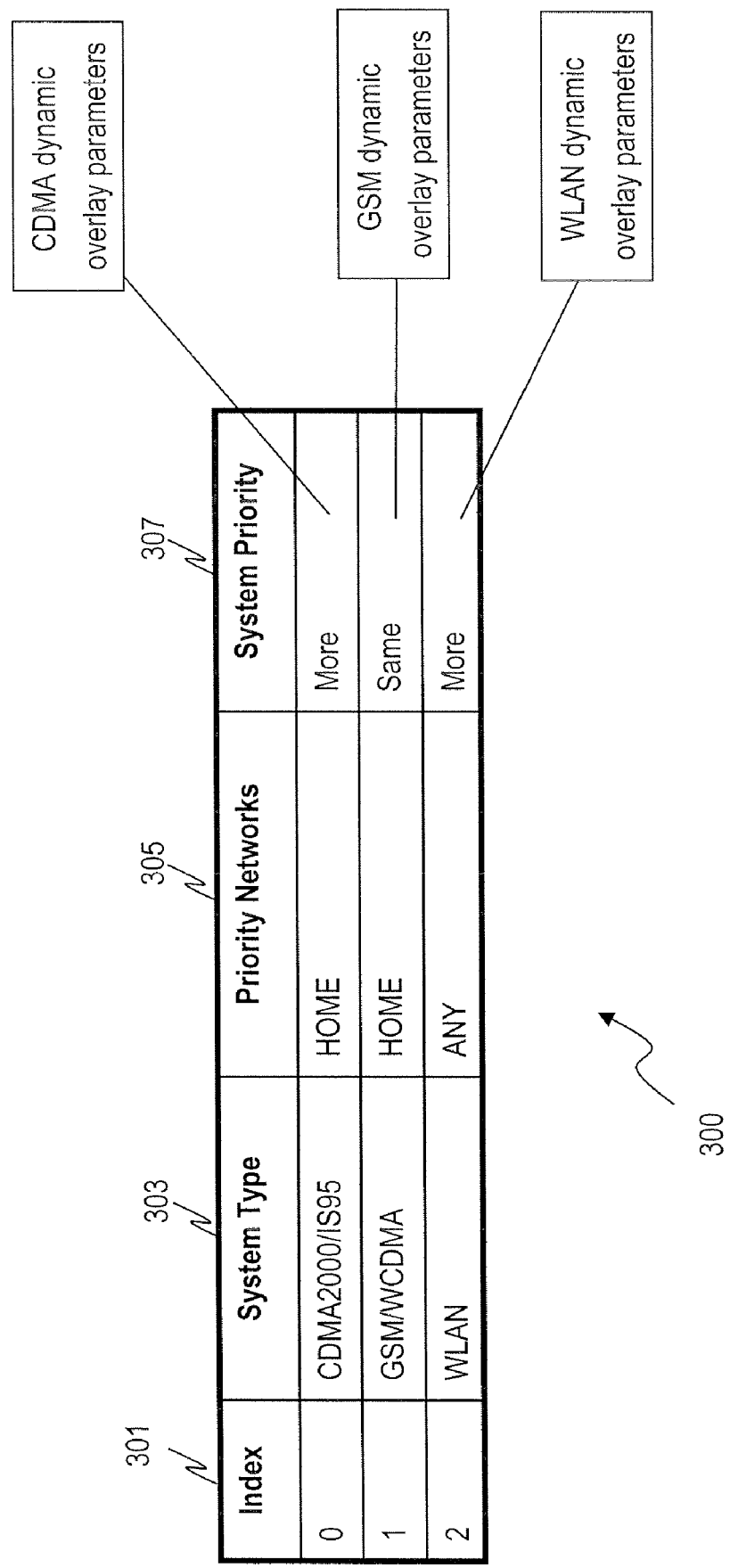
FIG. 3 is a diagram of a system priority list linking dynamic overlay parameters, in accordance with an embodiment of the invention.

FIG. 3 is a diagram of a system priority list linking dynamic overlay parameters, in accordance with an embodiment of the invention. A list or table 300 includes a unique identifier such as an index field 301, as well as s system type field 303, a priority networks field 305, and a system priority field 307. In an exemplary embodiment, Table 300 shows how the system priority (which is an overlay static parameter) is linked to dynamic parameters. As shown, the system priority value, "MORE," of CDMA 2000/IS95 can be linked to CDMA dynamic overlay parameters. The system priority value, "SAME," of the GSM/WCDMA can be linked to GSM dynamic overlay parameters. The system priority of the WLAN can be linked to WLAN dynamic overlay parameters. It is noted that for each system, there is a set of dynamic parameters whose values are obtained during, for example, reselection, to determine the best system.

Figure 4A:
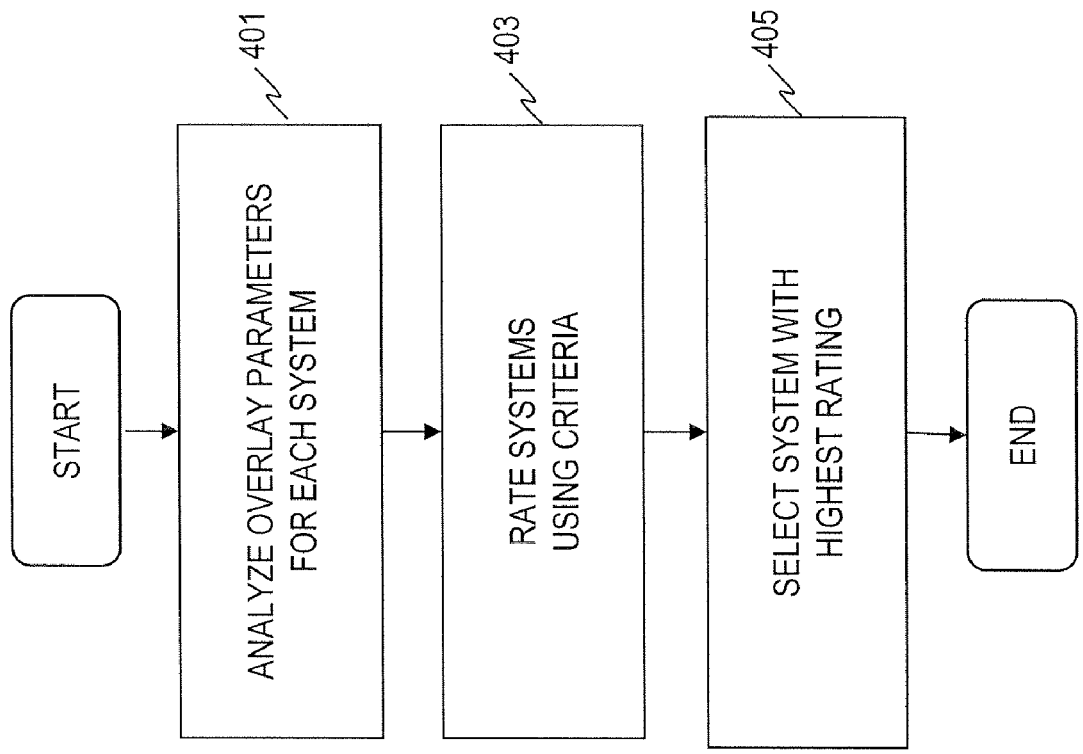
FIGS. 4A and 4B are flowcharts of processes for system selection, in accordance with various embodiments of the invention.
Figure 4B:
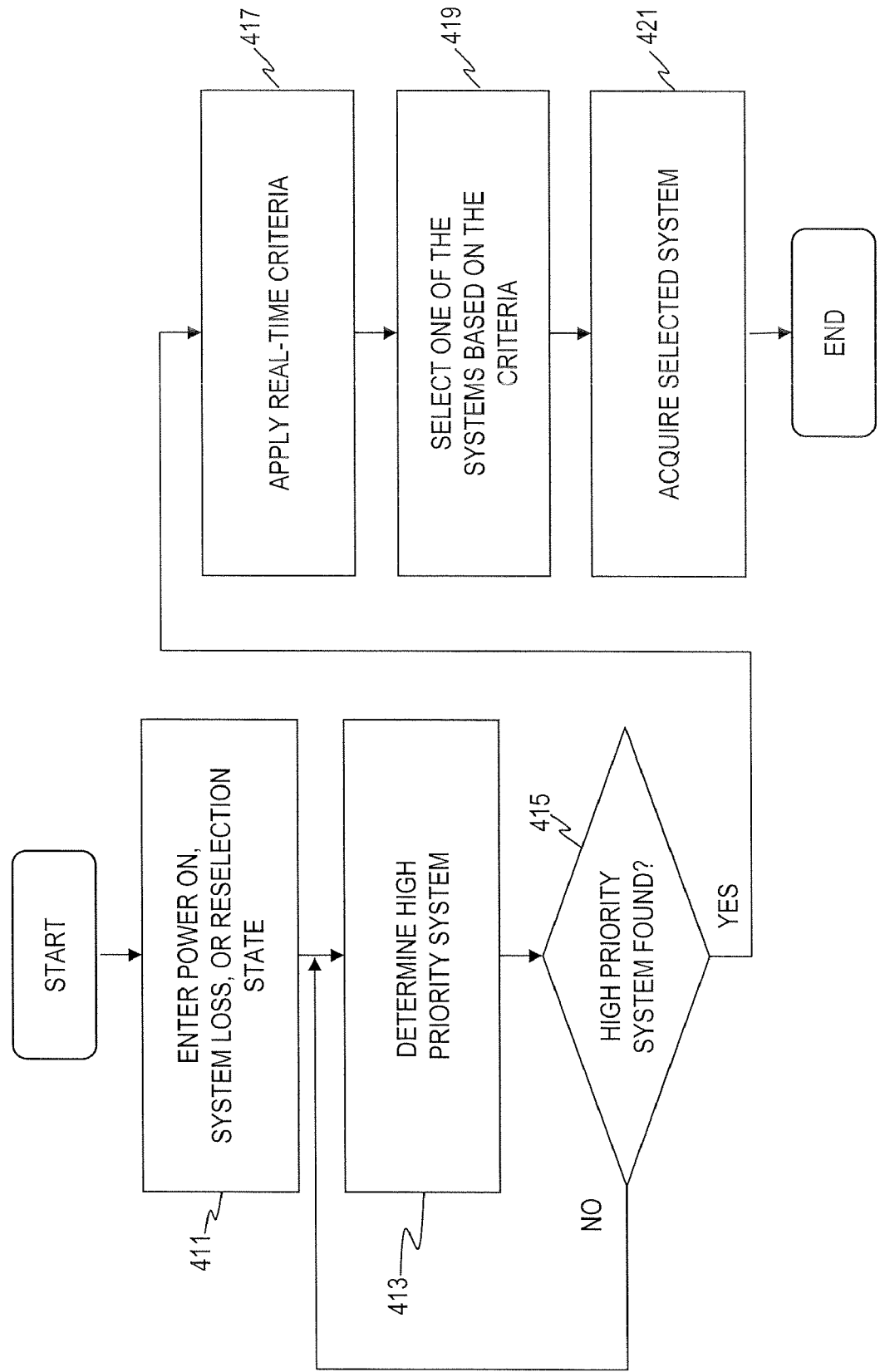

FIGS. 4A and 4B are flowcharts of processes for system selection, in accordance with various embodiments of the invention. In FIG. 4A, with reference to the terminal 101 of FIG. 1A, in step 401, the mode selection logic 125 essentially analyzes the overlay parameters (static and dynamic parameters) to rate the systems using a predetermined criteria (step 403). Based on this rating, per step 405, the "best" or "highest" rated system is selected.

With respect to FIG. 4B, at the start of the process, in step 411, the wireless terminal 101 (e.g., mobile station) is in either on power-on state, system-loss state or re-selection state (i.e., terminal is attempting to reselect a system while operating in a specific mode). The wireless terminal 101 searches for a higher priority system, per step 413, based on the programmed (static) parameters (system priority list). The system priority list (as shown in FIG. 3) is a list of systems prioritized or ranked based on a selection criteria. The wireless terminal finds an available "higher" priority system (per step 415). Otherwise, the system again searches for the next higher priority system. For the available high priority system, the wireless terminal obtains real-time measurements on the parameters defined to be used in the criteria (e.g., power measurement of GSM/WLAN beacon, pilot strength, LQM etc.).

In step 417, the wireless terminal 101 can then apply the real-time criteria over static parameters in system priority list 300 and switches to the most preferred system. If the available high priority system is, for example, CDMA, then the wireless terminal 101 takes measurements on the next priority systems in the system priority list (e.g., available GSM, WLAN). The wireless station can decide the best system based on comparing the measurement (power/LQM) on the available high priority system and next priority systems.

In step 419, the wireless terminal 101 then can select the best system and acquire the network (e.g., network 103, 105, or 107), as in step 421. At this stage, the wireless station 101 can both receive and transmit in the selected system.

The described dynamic approach, according to certain embodiments, provides system selection that ensures a certain level of service and network performance. This allows for the best use of the static parameters. The approach also provides flexibility to set new criteria for system priority. Further, this arrangement takes into consideration conditions of a visited location, as systems defined in the static priority list may not be the best system in a visited location.

One of ordinary skill in the art would recognize that the processes for system selection based on overlay parameters may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 5.

Figure 5:
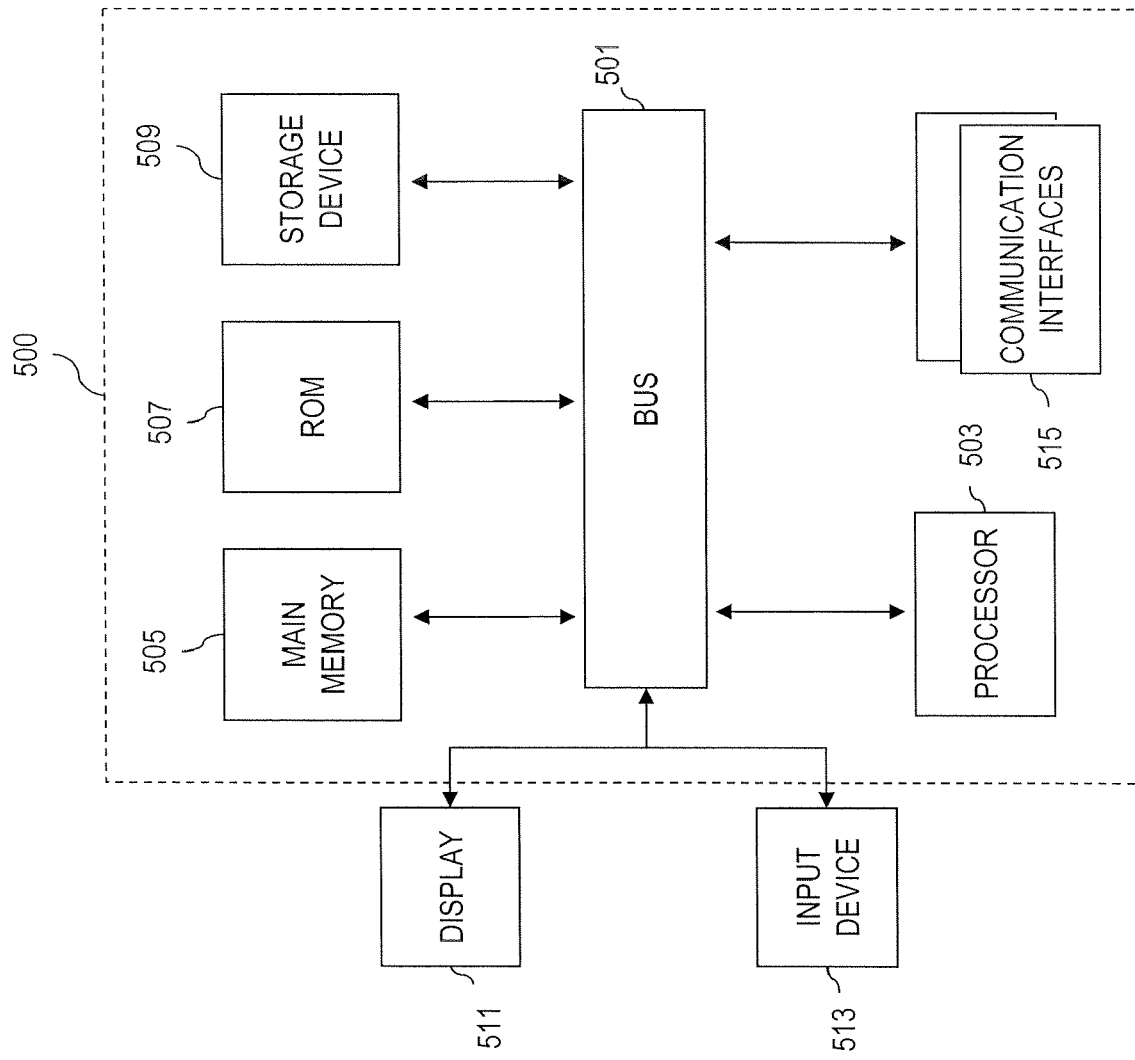
FIG. 5 is a diagram of hardware that can be used to implement an embodiment of the invention.

FIG. 5 illustrates exemplary hardware upon which various embodiments of the invention can be implemented. A computing system 500 includes a bus 501 or other communication mechanism for communicating information and a processor 503 coupled to the bus 501 for processing information. The computing system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computing system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computing system 500 may be coupled via the bus 501 to a display 511, such as a liquid crystal display, or active matrix display, for displaying information to a user. An input device 513, such as a keyboard including alphanumeric and other keys, may be coupled to the bus 501 for communicating information and command selections to the processor 503. The input device 513 can include a cursor control, such as a mouse, a trackball, or cursor direction keys, for communicating direction information and command selections to the processor 503 and for controlling cursor movement on the display 511.

According to various embodiments of the invention, the processes described herein can be provided by the computing system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 500 also includes at least one communication interface 515 coupled to bus 501. The communication interface 515 provides a two-way data communication coupling to a network link (not shown). The communication interface 515 sends and receives electrical, electromagnetic, or optical signals that carry digital data streams representing various types of information. Further, the communication interface 515 can include peripheral interface devices, such as a Universal Serial Bus (USB) interface, a PCMCIA (Personal Computer Memory Card International Association) interface, etc.

The processor 503 may execute the transmitted code while being received and/or store the code in the storage device 509, or other non-volatile storage for later execution. In this manner, the computing system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6A:
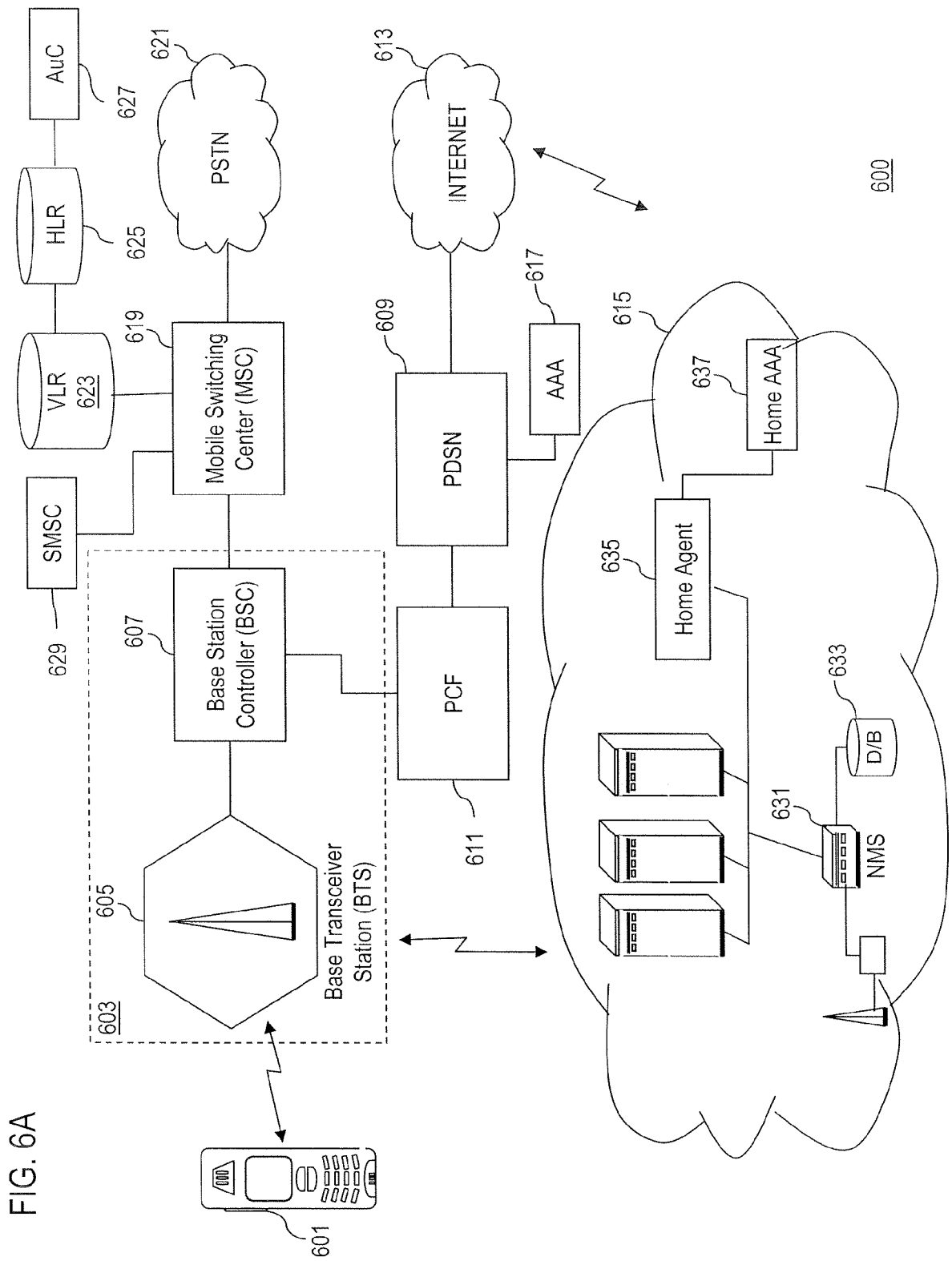
FIGS. 6A and 6B are diagrams of different cellular mobile phone systems capable of supporting various embodiments of the invention.
Figure 6B:
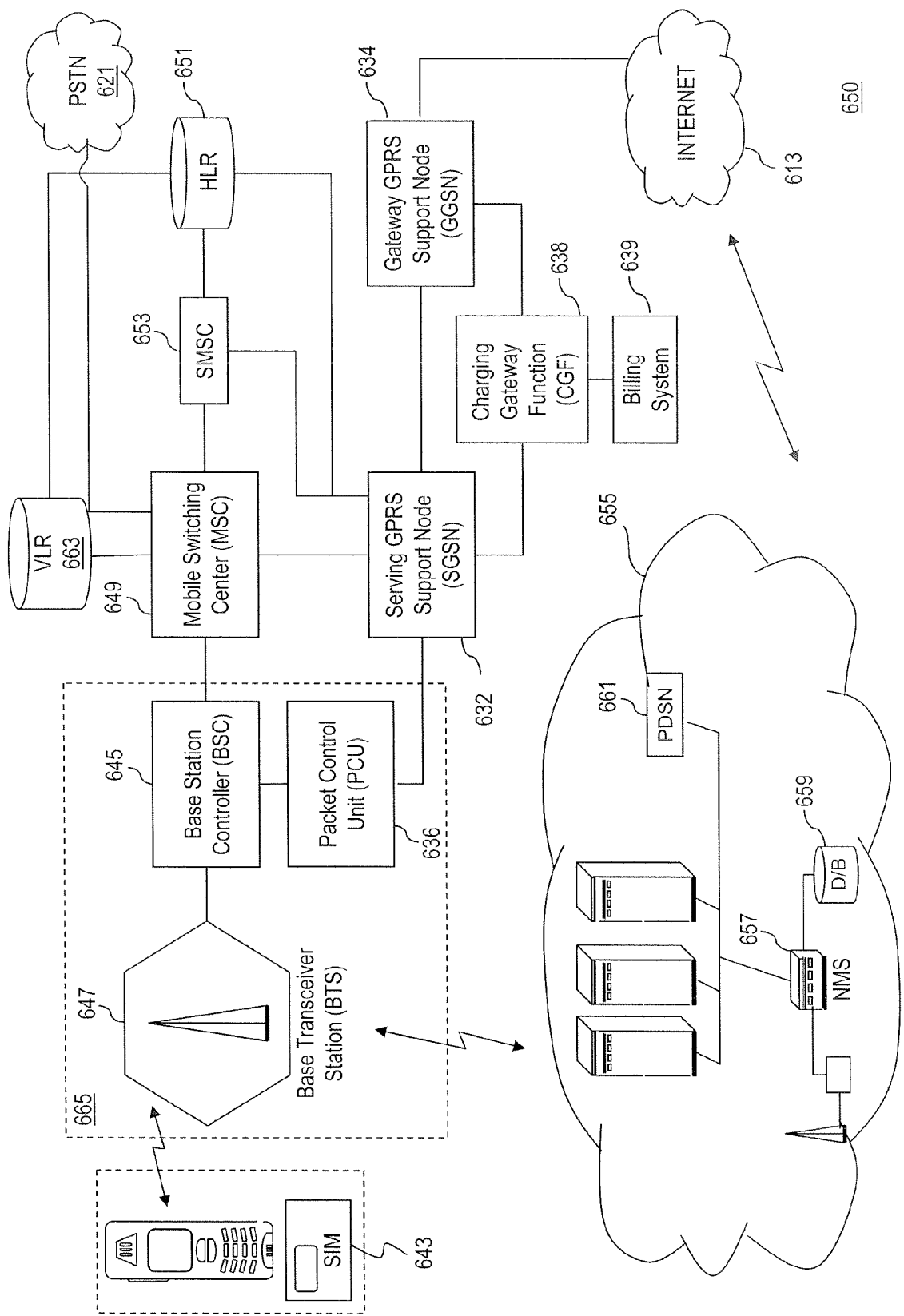

FIGS. 6A and 6B are diagrams of different cellular mobile phone systems capable of supporting various embodiments of the invention. FIGS. 6A and 6B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 600 includes mobile stations 601 (e.g., handsets, terminals, stations, units, devices, or any type of interface to the user (such as "wearable" circuitry, etc.)) in communication with a Base Station Subsystem (BSS) 603. According to one embodiment of the invention, the radio network supports Third Generation (3G) services as defined by the International Telecommunications Union (ITU) for International Mobile Telecommunications 2000 (IMT-2000).

In this example, the BSS 603 includes a Base Transceiver Station (BTS) 605 and Base Station Controller (BSC) 607. Although a single BTS is shown, it is recognized that multiple BTSs are typically connected to the BSC through, for example, point-to-point links. Each BSS 603 is linked to a Packet Data Serving Node (PDSN) 609 through a transmission control entity, or a Packet Control Function (PCF) 611. Since the PDSN 609 serves as a gateway to external networks, e.g., the Internet 613 or other private consumer networks 615, the PDSN 609 can include an Access, Authorization and Accounting system (AAA) 617 to securely determine the identity and privileges of a user and to track each user's activities. The network 615 comprises a Network Management System (NMS) 631 linked to one or more databases 733 that are accessed through a Home Agent (HA) 635 secured by a Home AAA 637.

Although a single BSS 603 is shown, it is recognized that multiple BSSs 603 are typically connected to a Mobile Switching Center (MSC) 619. The MSC 619 provides connectivity to a circuit-switched telephone network, such as the Public Switched Telephone Network (PSTN) 621. Similarly, it is also recognized that the MSC 619 may be connected to other MSCs 619 on the same network 600 and/or to other radio networks. The MSC 619 is generally collocated with a Visitor Location Register (VLR) 623 database that holds temporary information about active subscribers to that MSC 619. The data within the VLR 623 database is to a large extent a copy of the Home Location Register (HLR) 625 database, which stores detailed subscriber service subscription information. In some implementations, the HLR 625 and VLR 623 are the same physical database; however, the HLR 625 can be located at a remote location accessed through, for example, a Signaling System Number 7 (SS7) network. An Authentication Center (AuC) 627 containing subscriber-specific authentication data, such as a secret authentication key, is associated with the HLR 625 for authenticating users. Furthermore, the MSC 619 is connected to a Short Message Service Center (SMSC) 629 that stores and forwards short messages to and from the radio network 600.

During typical operation of the cellular telephone system, BTSs 605 receive and demodulate sets of reverse-link signals from sets of mobile units 601 conducting telephone calls or other communications. Each reverse-link signal received by a given BTS 605 is processed within that station. The resulting data is forwarded to the BSC 607. The BSC 607 provides call resource allocation and mobility management functionality including the orchestration of soft handoffs between BTSs 605. The BSC 607 also routes the received data to the MSC 619, which in turn provides additional routing and/or switching for interface with the PSTN 621. The MSC 619 is also responsible for call setup, call termination, management of inter-MSC handover and supplementary services, and collecting, charging and accounting information. Similarly, the radio network 600 sends forward-link messages. The PSTN 621 interfaces with the MSC 619. The MSC 619 additionally interfaces with the BSC 607, which in turn communicates with the BTSs 605, which modulate and transmit sets of forward-link signals to the sets of mobile units 601.

As shown in FIG. 6B, the two key elements of the General Packet Radio Service (GPRS) infrastructure 650 are the Serving GPRS Supporting Node (SGSN) 632 and the Gateway GPRS Support Node (GGSN) 634. In addition, the GPRS infrastructure includes a Packet Control Unit PCU (636) and a Charging Gateway Function (CGF) 638 linked to a Billing System 639. A GPRS the Mobile Station (MS) 641 employs a Subscriber Identity Module (SIM) 643.

The PCU 636 is a logical network element responsible for GPRS-related functions such as air interface access control, packet scheduling on the air interface, and packet assembly and re-assembly. Generally the PCU 636 is physically integrated with the BSC 645; however, it can be collocated with a BTS 647 or a SGSN 632. The SGSN 632 provides equivalent functions as the MSC 649 including mobility management, security, and access control functions but in the packet-switched domain. Furthermore, the SGSN 632 has connectivity with the PCU 636 through, for example, a Frame Relay-based interface using the BSS GPRS protocol (BSSGP). Although only one SGSN is shown, it is recognized that that multiple SGSNs 631 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 645, any given BSC 645 generally interfaces with one SGSN 632. Also, the SGSN 632 is optionally connected with the HLR 651 through an SS7-based interface using GPRS enhanced Mobile Application Part (MAP) or with the MSC 649 through an SS7-based interface using Signaling Connection Control Part (SCCP). The SGSN/HLR interface allows the SGSN 632 to provide location updates to the HLR 651 and to retrieve GPRS-related subscription information within the SGSN service area. The SGSN/MSC interface enables coordination between circuit-switched services and packet data services such as paging a subscriber for a voice call. Finally, the SGSN 632 interfaces with a SMSC 653 to enable short messaging functionality over the network 650.

The GGSN 634 is the gateway to external packet data networks, such as the Internet 613 or other private customer networks 655. The network 655 comprises a Network Management System (NMS) 657 linked to one or more databases 659 accessed through a PDSN 661. The GGSN 634 assigns Internet Protocol (IP) addresses and can also authenticate users acting as a Remote Authentication Dial-In User Service host. Firewalls located at the GGSN 634 also perform a firewall function to restrict unauthorized traffic. Although only one GGSN 634 is shown, it is recognized that a given SGSN 632 may interface with one or more GGSNs 633 to allow user data to be tunneled between the two entities as well as to and from the network 650. When external data networks initialize sessions over the GPRS network 650, the GGSN 634 queries the HLR 651 for the SGSN 632 currently serving a MS 641.

The BTS 647 and BSC 645 manage the radio interface, including controlling which Mobile Station (MS) 641 has access to the radio channel at what time. These elements essentially relay messages between the MS 641 and SGSN 632. The SGSN 632 manages communications with an MS 641, sending and receiving data and keeping track of its location. The SGSN 632 also registers the MS 641, authenticates the MS 641, and encrypts data sent to the MS 641.

Figure 7:
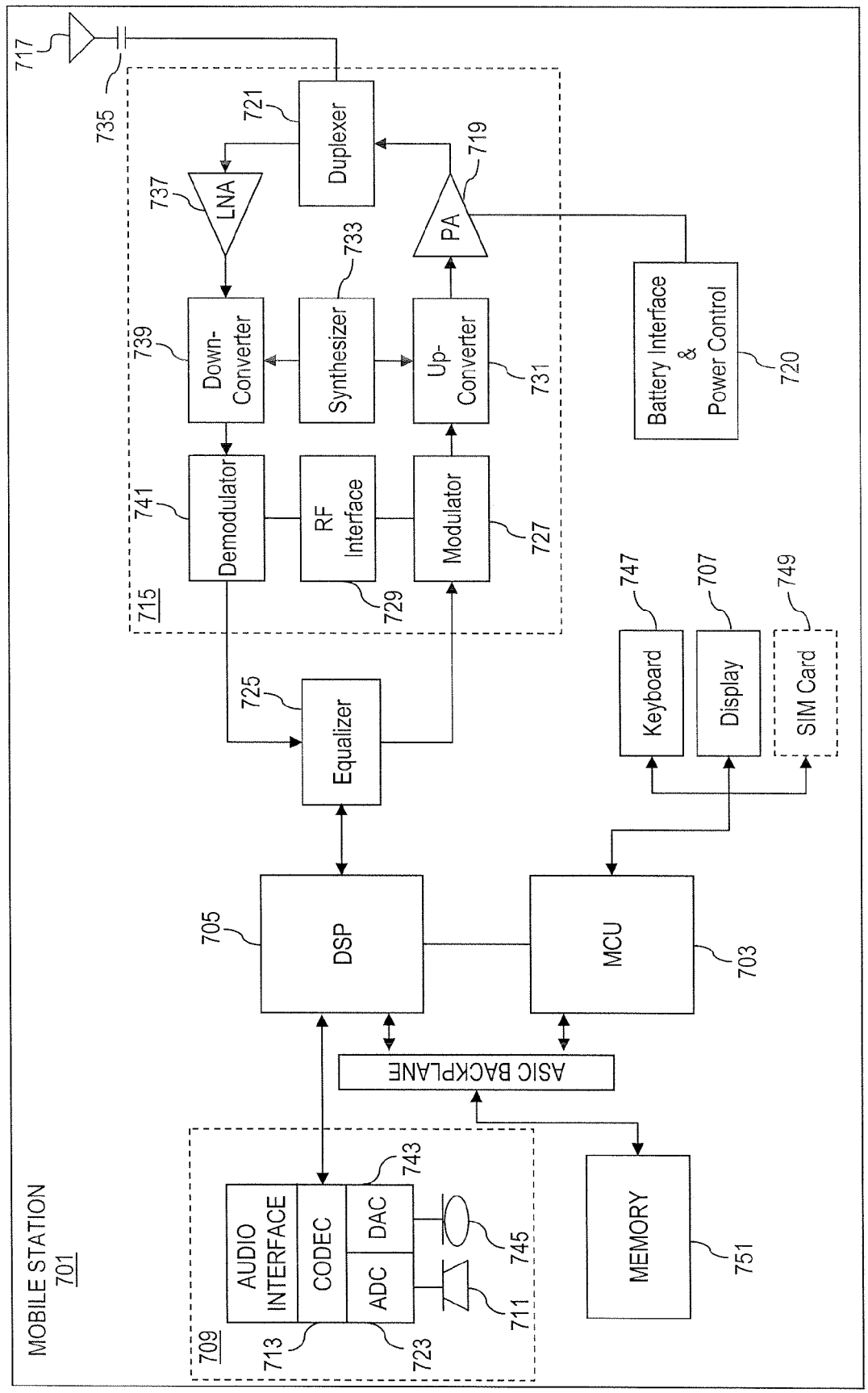
FIG. 7 is a diagram of exemplary components of a mobile station capable of operating in the systems of FIGS. 6A and 6B, according to an embodiment of the invention.

FIG. 7 is a diagram of exemplary components of a mobile station (e.g., handset) capable of operating in the systems of FIGS. 6A and 6B, according to an embodiment of the invention. Generally, a radio receiver is often defined in terms of front-end and back-end characteristics. The front-end of the receiver encompasses all of the Radio Frequency (RF) circuitry whereas the back-end encompasses all of the baseband processing circuitry. Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile station functions. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system (e.g., systems of FIG. 6A or 6B), via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile station 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The MCU 703 delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the station. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile station 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile station 701 on a radio network. The card 749 also contains a memory for storing a personal telephone number registry, text messages, and user specific mobile station settings.

Figure 8:
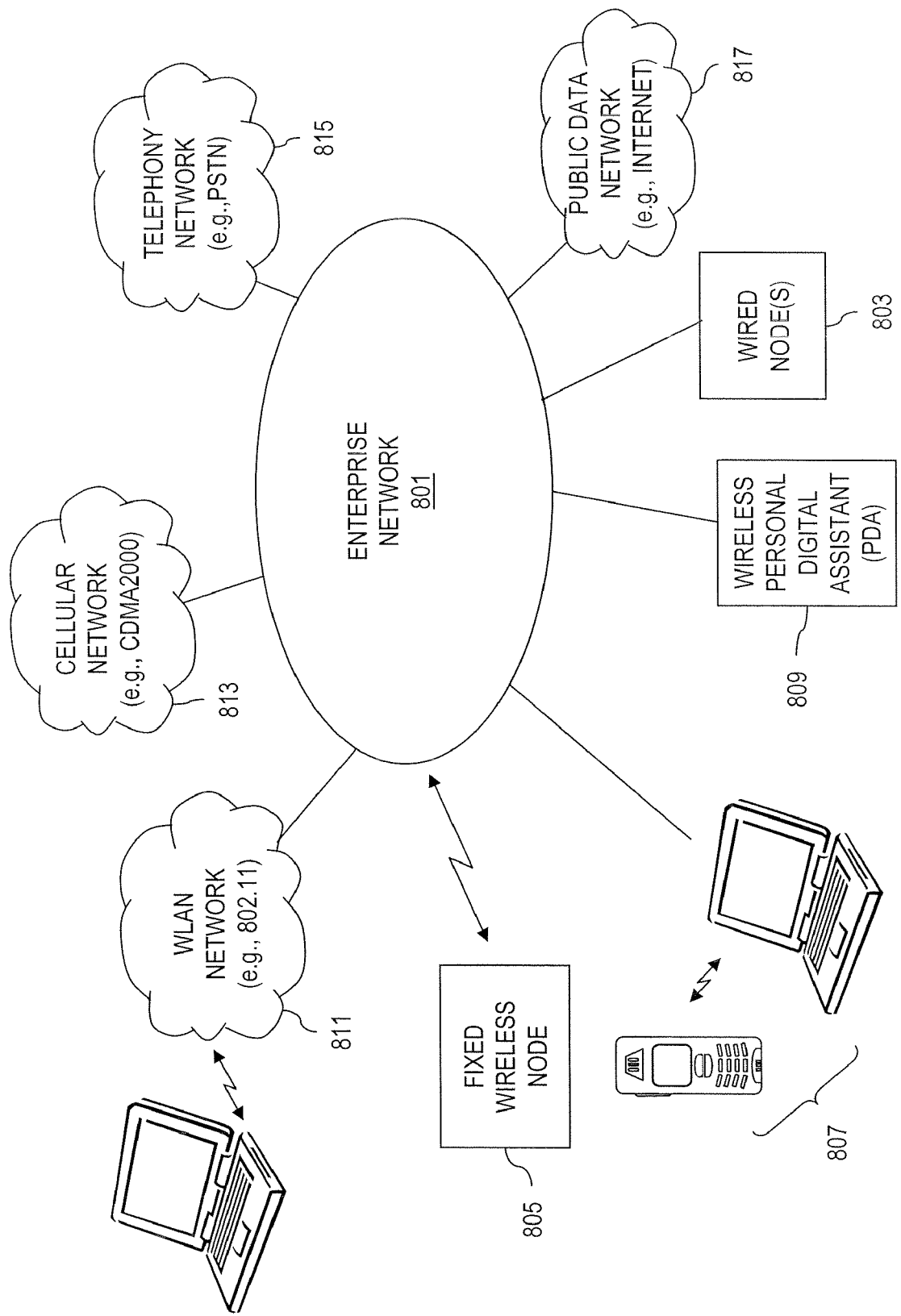
FIG. 8 is a diagram of an enterprise network capable of supporting the processes described herein, according to an embodiment of the invention.

FIG. 8 shows an exemplary enterprise network, which can be any type of data communication network utilizing packet-based and/or cell-based technologies (e.g., Asynchronous Transfer Mode (ATM), Ethernet, IP-based, etc.). The enterprise network 801 provides connectivity for wired nodes 803 as well as wireless nodes 805-809 (fixed or mobile), which are each configured to perform the processes described above. The enterprise network 801 can communicate with a variety of other networks, such as a WLAN network 811 (e.g., IEEE 802.11), a cdma2000 cellular network 813, a telephony network 816 (e.g., PSTN), or a public data network 817 (e.g., Internet).

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining to acquire a plurality of overlay parameters associated with a plurality of networks, wherein the networks are different from one another;
    determining to rate, at a multi-mode mobile station, each of the networks using the overlay parameters according to one or more selection criteria; and
    determining to select one of the networks based on the rating.

2. The method according to claim 1, wherein the overlay parameters include a static parameter and a dynamic parameter, wherein the dynamic parameter is provided in real-time.

3. The method according to claim 2, further comprising:
receiving update of the static parameter over an air interface.

4. The method according to claim 1, further comprising:
detecting one of a power-on state, a system loss state, or a reselection state to initiate selection of one of the networks.

5. The method according to claim 1, wherein the networks are specified in a priority list, the dynamic parameter including duration between scanning for a next one of the networks in the priority list.

6. The method according to claim 1, wherein the networks include a Global System for Mobile Communications (GSM) network; a Code Division Multiple Access (CDMA) network; and a wireless local area network (LAN) compliant with an Institute of Electrical and Electronic Engineers (IEEE) 802.11 architecture or a wireless metropolitan area network (WMAN) compliant with an IEEE 802.16 architecture.

7. The method according to claim 1, wherein the overlay parameters include measurements relating to transmission power, link quality, service quality, or service availability.

8. The method according to claim 1, wherein the step of acquiring includes measuring link quality for each of the networks, the measured link quality being included as part of the overlay parameters.

9. An apparatus comprising:
selection logic configured to acquire a plurality of overlay parameters associated with a plurality of networks, wherein the networks are different from one another,
wherein the selection logic is further configured to rate each of the networks using the overlay parameters according to one or more selection criteria, and to select one of the networks based on the rating.

10. The apparatus according to claim 9, wherein the overlay parameters include a static parameter and a dynamic parameter, wherein the dynamic parameter is provided in real-time.

11. The apparatus according to claim 10, wherein the selection logic is further configured to receive update of the static parameter that is transmitted over an air interface.

12. The apparatus according to claim 9, wherein one of a power-on state, a system loss state, or a reselection state is detected to initiate selection of one of the networks.

13. The apparatus according to claim 9, wherein the networks are specified in a priority list, the dynamic parameter including duration between scanning for a next one of the networks in the priority list.

14. The apparatus according to claim 9, wherein the networks include a Global System for Mobile Communications (GSM) network; a Code Division Multiple Access (CDMA) network; and a wireless local area network (LAN) compliant with an Institute of Electrical and Electronic Engineers (IEEE) 802.11 architecture or a wireless metropolitan area network (WMAN) compliant with an IEEE 802.16 architecture.

15. The apparatus according to claim 9, wherein the overlay parameters include measurements relating to transmission power, link quality, service quality, or service availability.

16. The apparatus according to claim 9, further comprising:
a measurement unit configured to measure link quality for each of the networks, the measured link quality being included as part of the overlay parameters.

17. A system comprising:
a server configured to store a plurality of overlay parameters associated with one of a plurality of networks, wherein the networks are different from one another; and
a base station configured to communicate with the server and to transmit the overlay parameters over the one network to a multi-mode mobile station that is configured to operate with each of the networks,
wherein the multi-mode mobile station is within an overlapping coverage area of the networks, the multi-mode mobile station being further configured to rate each of the networks using the overlay parameters according to one or more selection criteria, and to select one of the networks based on the rating.

18. The system according to claim 17, wherein the overlay parameters include a static parameter and a dynamic parameter, wherein the dynamic parameter is provided in real-time.

19. The system according to claim 18, wherein the selection logic is further configured to receive update of the static parameter over an air interface.

20. The system according to claim 17, wherein one of a power-on state, a system loss state, or a reselection state is detected to initiate selection of one of the networks.

21. The system according to claim 17, wherein the networks are specified in a priority list, the dynamic parameter including duration between scanning for a next one of the networks in the priority list.

22. The system according to claim 17, wherein the networks include a Global System for Mobile Communications (GSM) network; a Code Division Multiple Access (CDMA) network; and a wireless local area network (LAN) compliant with an Institute of Electrical and Electronic Engineers (IEEE) 802.11 architecture or a wireless metropolitan area network (WMAN) compliant with an IEEE 802.16 architecture.

23. The system according to claim 17, wherein the overlay parameters include measurements relating to transmission power, link quality, service quality, or service availability.

24. The system according to claim 17, wherein the mobile station includes a measurement unit configured to measure link quality for each of the networks, the measured link quality being included as part of the overlay parameters.

25. A method comprising:
determining to store an overlay parameter for a network, wherein the overlay parameter includes a dynamic parameter that is provided in real-time, and a static parameter; and
determining to transmit, using a base station, the overlay parameter to a mobile station configured to acquire a plurality of overlay parameters from a plurality of networks, wherein the networks are different from one another, the mobile station being further configured to rate each of the networks using the overlay parameters to select one of the networks based on the rating.

26. The method according to claim 25, wherein the networks are specified in a priority list, the dynamic parameter including duration between scanning for a next one of the networks in the priority list.

27. The method according to claim 25, wherein the networks include a Global System for Mobile Communications (GSM) network; a Code Division Multiple Access (CDMA) network; and a wireless local area network (LAN) compliant with an Institute of Electrical and Electronic Engineers (IEEE) 802.11 architecture or a wireless metropolitan area network (WMAN) compliant with an IEEE 802.16 architecture.

28. The method according to claim 25, wherein the overlay parameter include measurements relating to transmission power, link quality, service quality, or service availability of the network.

29. An apparatus comprising:

a memory configured to store an overlay parameter for a network, wherein the overlay parameter includes a dynamic parameter that is provided in real-time, and a static parameter; and a communication interface configured to transmit the overlay parameter via a base station to a mobile station, the mobile station being configured to acquire a plurality of overlay parameters from a plurality of networks, wherein the networks are different from one another, the mobile station being further configured to rate each of the networks using the overlay parameters to select one of the networks based on the rating.

30. The apparatus according to claim 29, wherein the networks are specified in a priority list, the dynamic parameter including duration between scanning for a next one of the networks in the priority list.

31. The apparatus according to claim 29, wherein the networks include a Global System for Mobile Communications (GSM) network; a Code Division Multiple Access (CDMA) network; and a wireless local area network (LAN) compliant with an Institute of Electrical and Electronic Engineers (IEEE) 802.11 architecture or a wireless metropolitan area network (WMAN) compliant with an IEEE 802.16 architecture.

32. The apparatus according to claim 29, wherein the overlay parameter include measurements relating to transmission power, link quality, service quality, or service availability of the network.

33. The apparatus according to claim 29, wherein the apparatus is a server associated with the network.

* * * * *